United States Patent
Ting et al.

(10) Patent No.: US 7,921,077 B2
(45) Date of Patent: Apr. 5, 2011

(54) SYSTEM AND METHOD FOR MANAGING DATA DEDUPLICATION OF STORAGE SYSTEMS UTILIZING PERSISTENT CONSISTENCY POINT IMAGES

(75) Inventors: Daniel Ting, Palo Alto, CA (US); Ling Zheng, Sunnyvale, CA (US); Stephen L. Manley, Pleasanton, CA (US); John Frederick DeStefano, Newark, CA (US)

(73) Assignee: NetApp, Inc., Sunnyvale, CA (US)

( * ) Notice: Subject to any disclaimer, the term of this patent is extended or adjusted under 35 U.S.C. 154(b) by 220 days.

(21) Appl. No.: 11/478,272

(22) Filed: Jun. 29, 2006

(65) Prior Publication Data

US 2008/0005201 A1    Jan. 3, 2008

(51) Int. Cl.
G06F 17/30    (2006.01)

(52) U.S. Cl. .................................... 707/610; 707/661

(58) Field of Classification Search .................. None
See application file for complete search history.

(56) References Cited

U.S. PATENT DOCUMENTS

| | | |
|---|---|---|
| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |
| 5,732,265 A * | 3/1998 | Dewitt et al. ............ 707/200 |
| 5,819,292 A | 10/1998 | Hitz et al. |
| 5,907,672 A | 5/1999 | Matze et al. |
| 5,990,810 A | 11/1999 | Williams |
| 6,061,770 A | 5/2000 | Franklin |
| 6,081,875 A | 6/2000 | Clifton et al. |
| 6,289,451 B1 | 9/2001 | Dice |
| 6,341,341 B1 | 1/2002 | Grummon et al. |
| 6,374,266 B1 | 4/2002 | Shnelvar |
| 6,892,211 B2 | 5/2005 | Hitz |
| 7,010,553 B2 * | 3/2006 | Chen et al. .............. 707/203 |

(Continued)

FOREIGN PATENT DOCUMENTS

EP    1349 089 A2    1/2003

(Continued)

OTHER PUBLICATIONS

Business Wire, "SEPATON Announces Next Generation Data De-Duplication Software; Delivers Industry's Highest Level of De-Duplication without Affecting Backup Performance." May 8, 2006 Jun. 7, 2008 <http://findarticles.com/p/articles/mi_m0EIN/is_2006_May_8/ai_n16347840>.*

(Continued)

*Primary Examiner* — Yicun Wu
*Assistant Examiner* — Syed H Hasan
(74) *Attorney, Agent, or Firm* — Cesari and McKenna, LLP

(57) ABSTRACT

A system and method for managing data deduplication of a storage system utilizing persistent consistency point images (PCPIs). Once a target PCPI of a data transfer is generated, a backup management module of the storage system alerts a data deduplication module to begin deduplication of the data contained within the target PCPI. Once the deduplication procedure has been completed, the active file system of the storage system has been deduplicated, however, the target PCPI remains un-deduplicated. In response, the backup management module generates and exports a revised target PCPI. The previous target PCPI may then be deleted, thereby transitioning the exported PCPI's image of the state of the file system to a deduplicated state.

23 Claims, 14 Drawing Sheets

U.S. PATENT DOCUMENTS

| | | | |
|---|---|---|---|
| 7,043,485 | B2 | 5/2006 | Manley et al. |
| 7,072,910 | B2 | 7/2006 | Kahn et al. |
| 7,079,053 | B2 | 7/2006 | Kolavi |
| 7,103,602 | B2 | 9/2006 | Black et al. |
| 7,124,305 | B2 | 10/2006 | Margolus et al. |
| 7,127,577 | B2 | 10/2006 | Koning et al. |
| 7,162,662 | B1* | 1/2007 | Svarcas et al. .................. 714/15 |
| 7,289,643 | B2 | 10/2007 | Brunk et al. |
| 7,333,993 | B2 | 2/2008 | Fair |
| 7,475,098 | B2 | 1/2009 | Patterson et al. |
| 7,516,286 | B1* | 4/2009 | Dalal et al. .................... 711/162 |
| 7,698,532 | B1 | 4/2010 | Gonzalez |
| 2002/0059317 | A1* | 5/2002 | Black et al. ................... 707/200 |
| 2002/0194529 | A1 | 12/2002 | Doucette et al. |
| 2003/0018878 | A1 | 1/2003 | Dorward et al. |
| 2003/0182301 | A1* | 9/2003 | Patterson et al. ............ 707/102 |
| 2003/0182322 | A1 | 9/2003 | Manley et al. |
| 2004/0030668 | A1 | 2/2004 | Pawlowski et al. |
| 2004/0083245 | A1 | 4/2004 | Beeler |
| 2006/0020804 | A1 | 1/2006 | Schleifer et al. |
| 2007/0050423 | A1 | 3/2007 | Whalen et al. |
| 2007/0255758 | A1 | 11/2007 | Zheng et al. |
| 2008/0005141 | A1 | 1/2008 | Zheng et al. |
| 2008/0133561 | A1 | 6/2008 | Dubnicki et al. |
| 2008/0301134 | A1 | 12/2008 | Miller et al. |

FOREIGN PATENT DOCUMENTS

| | | |
|---|---|---|
| IN | 938/DEL/2007 | 4/2007 |
| WO | WO 02/08956 | 1/2002 |
| WO | WO 2007/127360 | 11/2007 |
| WO | WO 2008/005211 | 1/2008 |
| WO | WO 2008/005212 | 1/2008 |
| WO | WO 2008/153821 | 12/2008 |

OTHER PUBLICATIONS

Hong, Bo, et al. "Duplicate Data Elimination in a SAN File System." Proceedings of the 21st IEEE / 12th NASA Goddard Conference on Mass Storage Systems and Technologies (2004): 301-314. http://www.cse.ucsc.edu/—darrell/Papers/MSST-Hong-04.pdf.*

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al, *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

"Notification of Transmittal of the International Search Report and the Written Opinion of the International Searching Authority, or the Declaration," International Filing Date: Jun. 25, 2007, International Application No. PCT/US2007/014666, Applicant: Network Applicance, Inc., Date of Mailing: Feb. 22, 2008, pp. 1-18.

Hitz et al. "File System Design for an NFS File Server Appliance", presented Jan. 19, 1994 at USEIX Winter 1994—San Francisco, CA, 23 pages.

Zheng et al. "Method and Apparatus for Identifying and Eliminating Duplicate Data Blocks and Sharing Data Blocks in a Storage System", U.S. Appl. No. 11/105,895, filed Apr. 13, 2005, 46 pages.

Bilenko et al., Adaptive Duplicate Detection Using Learnable String Similarity Measures, Published in Proceedings of the Ninth ACM SIGKDD International Conference on Knowledge, Aug. 23, 2003, pp. 1-10.

Crochemore et al., Pattern Matching and Text Compression Algorithms, dated Jan. 8, 2003, retrieved from http://citeseer.comp.nus.edu.sg/595025.html, 50 pages.

EMC², Celerra File Server Architecture for High Availability, EMC² Corporation, Aug. 1999, 12 pages.

Muthitacharoen, Athicha, et al., "A Low-bandwidth Network File System," ACM SOSP. Proceedings of the ACM Symposium on Operating Systemprinciples, ACM, US, XP-002405303, Oct. 21, 2002, pp. 174-187.

Reichenberger, Delta Storage for Arbitrary Non-Text Files, published in Proceedings of the 3rd International Workshop on Software Configuration Management, Jun. 12-14, 1991, pp. 144-152.

National Institute of Standards and Technology, Federal Information Processing Standards Publication: The Keyed-Hash Message Authentication Code (HMAC), FIPS PUB 198, Information Technology Laboratory, Gaithersburg, Maryland, Mar. 2002, 20 pages.

Notification of Transmittal of the International Search Report and the Written Opinion of the International Searching Authority, or the Declaration, International Filing Date: Apr. 26, 2007, International Application No. PCT/US2007/010222, Applicant: Network Appliance, Inc., Date of Mailing: Apr. 9, 2008, pp. 1-15.

Notification of Transmittal of the International Search Report and the Written Opinion of the International Searching Authority, or the Declaration, International Filing Date: Jun. 25, 2007, International Application No. PCT/US2007/014664, Applicant: Network Appliance, Inc., Date of Mailing: Apr. 9, 2008, pp. 1-12.

"Notification of Transmittal of the International Search Report and the Written Opinion of the International Searching Authority, or the Declaration," International Filing Date: May 29, 2008, International Application No. PCT/US2008/006805, Applicant: Network Appliance, Inc., Date of Mailing: Oct. 27, 2008, pp. 1-15.

* cited by examiner

SYSTEM AND METHOD FOR MANAGING DATA DEDUPLICATION OF STORAGE SYSTEMS UTILIZING PERSISTENT CONSISTENCY POINT IMAGES

FIELD OF THE INVENTION

The present invention relates to the removal of duplicate data and, more particularly, to managing the removal of duplicate data in storage systems utilizing persistent consistency point images.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Certain known examples of file systems are capable of generating a snapshot of the file system or a portion thereof. Snapshots and the snapshotting procedure are further described in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al, issued Oct. 6, 1998, which is hereby incorporated by reference as though fully set forth herein. "Snapshot" is a trademark of Network Appliance, Inc. It is used for purposes of this patent to designate a persistent consistency point (CP) image (PCPI). A PCPI is a read-only, point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

PCPIs can be utilized as a form of backups for an active file system. To provide for improved data retrieval and restoration, PCPIs should be copied to another file system different than the volume or file system on which the PCPI was generated. In one known example, a backup storage system is utilized to store PCPIs and manage a collection of PCPIs according to a user defined set of options. Backup storage systems are described in further detail in U.S. Pat. No. 7,475,098, issued on Jan. 6, 2009 entitled SYSTEM AND METHOD FOR MANAGING A PLURALITY OF SNAPSHOTS, by Hugo Patterson et, al., which is hereby incorporated by reference.

In environments utilizing PCPIs as a form of backup, oftentimes the same data may be stored in multiple locations on the backup storage system. This may occur when, for example, a single data container contains a plurality of sections that contain the same data or when multiple data containers within a volume or other collections of data (i.e., data collection) contain the same data. Known techniques for reducing the amount of duplicate data may be utilized in a storage system to reduce the number of duplicate data blocks in, e.g., the active file system. However, in backup storage system environments where PCPIs are utilized, long term retention of the PCPIs may limit the effectiveness of conventional data deduplication techniques, primarily because the benefit of a data deduplication procedure, i.e., a reduction in the number of duplicate data blocks being stored, typically requires modifications to various data pointers within the data collection. As a PCPI is read only, the blocks in the PCPI remain "locked" (and thus not subject to deduplication) until the PCPI is deleted. In a non-backup storage system, PCPIs are typically deleted after a few days, so the long term PCPI retention limitation is minimized.

SUMMARY OF THE INVENTION

The present invention overcomes the disadvantages of the prior art by providing a system and method for managing data deduplication on a storage system utilizing one or more persistent consistency point images (PCPIs). Specifically, in a backup storage system utilizing PCPIs as a form of backup, a backup management module is configured to interface with a data deduplication module to implement data deduplication for one or more data collections e.g., volumes or file systems, within the backup storage system. In operation, the backup management module receives a transfer request from a source storage system ("source") and begins accepting transfers of the data collections from the source to a destination volume on the backup storage system. Once the last data transfer completes, the backup management module, in cooperation with a file system, generates a first PCPI of the destination volume. The backup management module then performs certain cleanup operations of temporary files generated during the course of the data transfers before generating a second PCPI of the destination volume. The backup management module then generates a third, or target, PCPI prior to exporting the target PCPI to one or more clients.

Once the target PCPI has been generated, the transfer request is deemed to have completed and the transferred data is accessible by the clients of the backup storage system. Additionally, once the target PCPI has been generated, the backup management module alerts the data deduplication module to begin deduplication of the data contained within the target PCPI. The data deduplication module performs a deduplication procedure by identifying and removing identical blocks of data until only one of the identical blocks of data is retained. Once the deduplication procedure has completed, the active file system of the backup storage system has been deduplicated, however, the exported target PCPI remains undeduplicated. In response, the backup management module generates and exports a revised target PCPI. The previous target PCPI may then be deleted, thereby transitioning the exported PCPI's image of the state of the file system to a deduplicated state.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Storage System Environment

Figure 1:
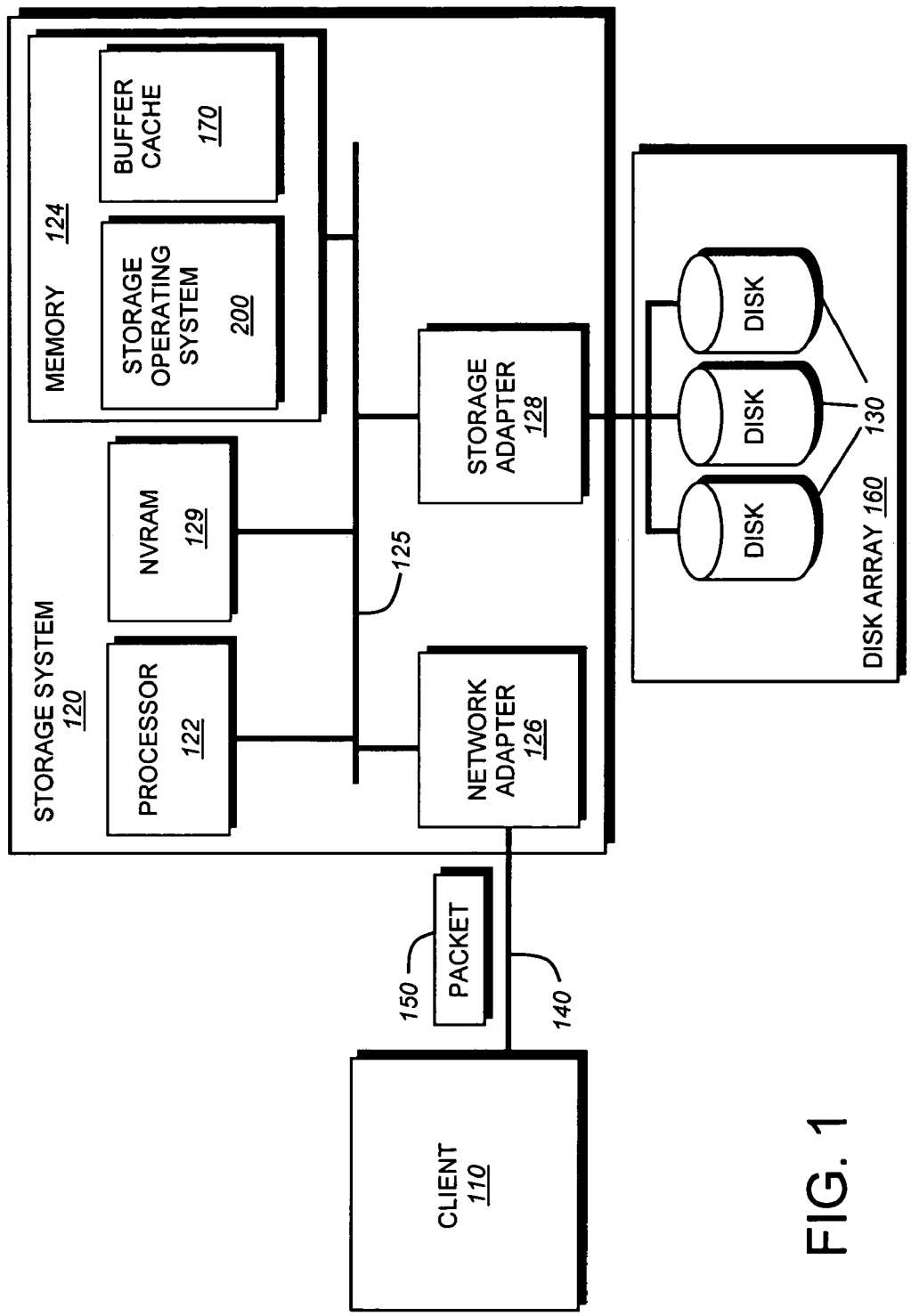
FIG. 1 is a schematic block diagram of a storage system environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126, a non-volatile random access memory (NVRAM) 129 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present invention. Additionally the NVRAM 129 may be utilized for storing changes to the file system between consistency points. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets 150 of data according to pre-defined protocols, such as the Transmission Control Protocol/Internet Protocol (TCP/IP).

The client 110 may be a general-purpose computer configured to execute applications or, as illustratively described herein, may comprise a storage system that utilizes the storage system 120 for backup operations (i.e., as a backup storage system). That is, in an illustrative embodiment of the present invention, the backup storage system 120 may function as backup server to store backups/mirrors for archival purposes. Such a use is further described in the above-incorporated U.S. patent application entitled SYSTEM AND METHOD FOR MANAGING A PLURALITY OF SNAPSHOTS.

The client 110 (or source storage system) may interact with the backup storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
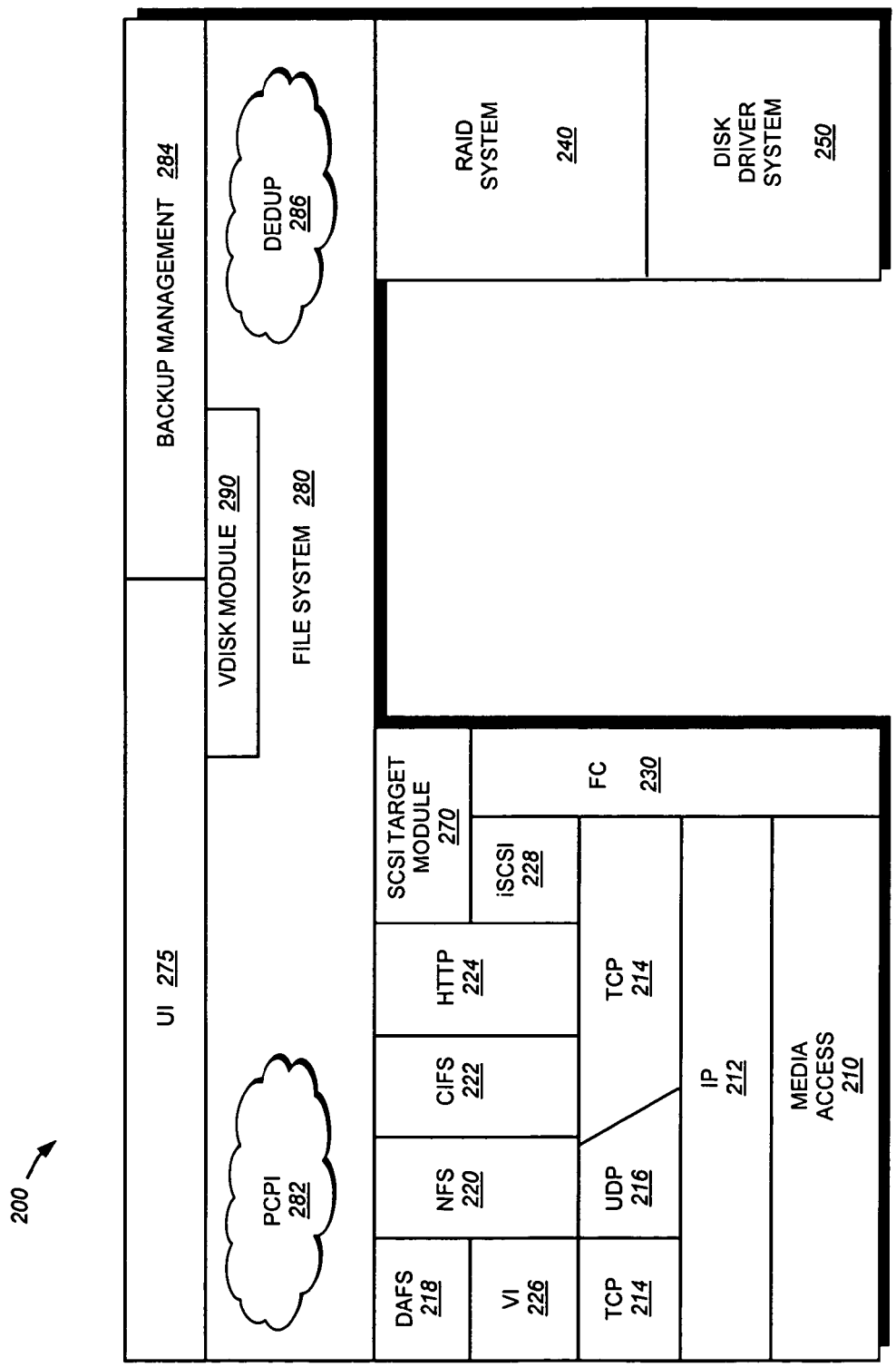
FIG. 2 is a schematic block diagram of an exemplary storage operating system executing on a storage system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 512 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems. Additionally, a set of PCPI processes 282 within the file system 280 enable generation of PCPIs, as described in detail further below.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk, dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

A backup management module 284 illustratively manages backup creation and interfacing with clients to perform backup operations. The backup management module 284 also cooperates with a data deduplication (dedup) module 286 of the file system to implement data deduplication in storage system 120 utilizing PCPIs in accordance with an embodiment of the present invention. The deduplication module 286 implements one or more data deduplication procedures for reducing the amount of duplicate data blocks stored by the storage system. In the illustrative embodiment, the data deduplication module implements the data deduplication technique described in U.S. patent application Ser. No. 11/105,895, filed on Apr. 13, 2005, entitled METHOD AND APPARATUS FOR IDENTIFYING AND ELIMINATING DUPLICATE DATA BLOCKS AND SHARING DATA BLOCKS IN A STORAGE SYSTEM, by Ling Zheng, et al, the contents of which are hereby incorporated by reference. However, in alternate embodiments, additional and/or differing deduplication techniques may be utilized.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system sementics. In this sense, the Data ONTAP® software is an example of such a storage operating system implemented as a microkernel and including the file system 280 to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a storage system appliance that may be advantageously used with the present invention is described in U.S. Patent Publication No. 2004/0030668 titled, MULTI-PROTOCOL STORAGE APPLIANCE THAT PROVIDES INTEGRATED SUPPORT FOR FILE AND BLOCK ACCESS PROTOCOLS, published on Feb. 12, 2004. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. On-Disk File System Structures

Figure 3:
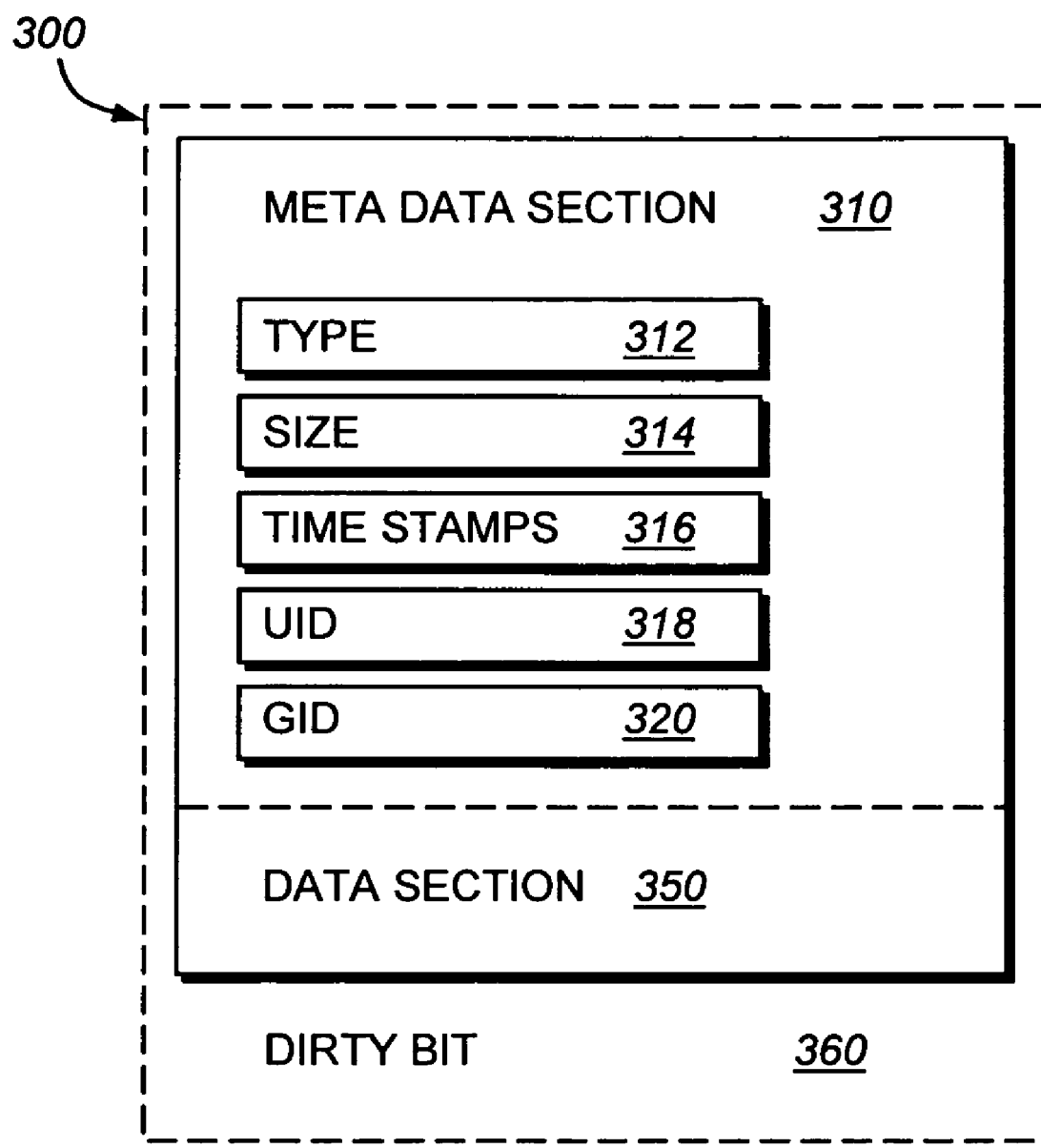
FIG. 3 is a schematic block diagram of an exemplary inode in accordance with an embodiment of the present invention.

In the illustrative embodiment, a file (or other data container) is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file, and ownership, e.g., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 may include a representation of the data associated with the file.

The data section 350 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

A write-anywhere file system (such as the WAFL file system) may have the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system further supports multiple PCPIs that are generally created on a regular schedule. Without limiting the generality of the term, each PCPI illustratively refers to a copy of the file system that diverges from the active file system over time as the active file system is modified. In the case of the WAFL file system, the active file system diverges from the PCPIs since the PCPIs stay in place as the active file system is written to new disk locations. Each PCPI is a restorable version of the storage element (e.g., the active file system) created at a predetermined point in time and, as noted, is "read-only" accessible and "space-conservative". Space conservative denotes that common parts of the storage element in multiple PCPIs share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in *TR3002 File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

Figure 4:
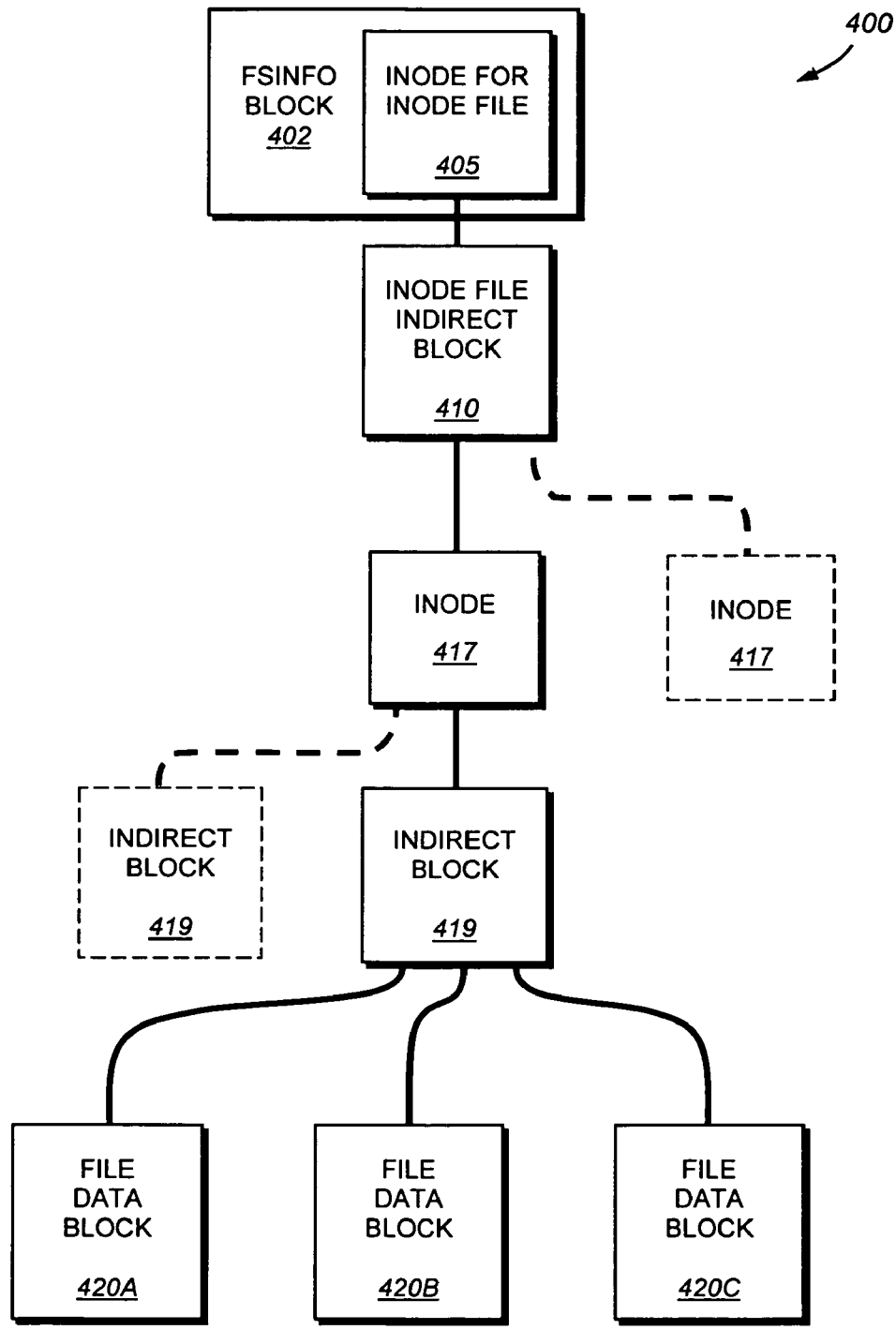
FIG. 4 is a schematic block diagram of the exemplary inode buffer tree in accordance with an embodiment of the present invention.

Broadly stated, a PCPI is stored on-disk along with the active file system, and is loaded into the memory of the storage system as requested by the storage operating system. The on-disk organization of the PCPI and the active file system can be understood from the following description of an exemplary file system inode structure 400 shown in FIG. 4. A file system information (fsinfo) block 402 includes the inode for an inode file 405 which contains information describing the inode file associated with a file system. In this exemplary file system inode structure, the inode for the inode file 405 contains a pointer that references (points to) an inode file indirect block 410. The inode file indirect block 410 contains a set of pointers that reference inode file blocks, each of which contains an array of inodes 417 that, in turn, contain pointers to indirect blocks 419. The indirect blocks 419 include pointers to file data blocks 420A, 420B and 420C. Each of the file data blocks 420(A-C) is capable of storing, e.g., 4 kilobytes (KB) of data.

Figure 5:
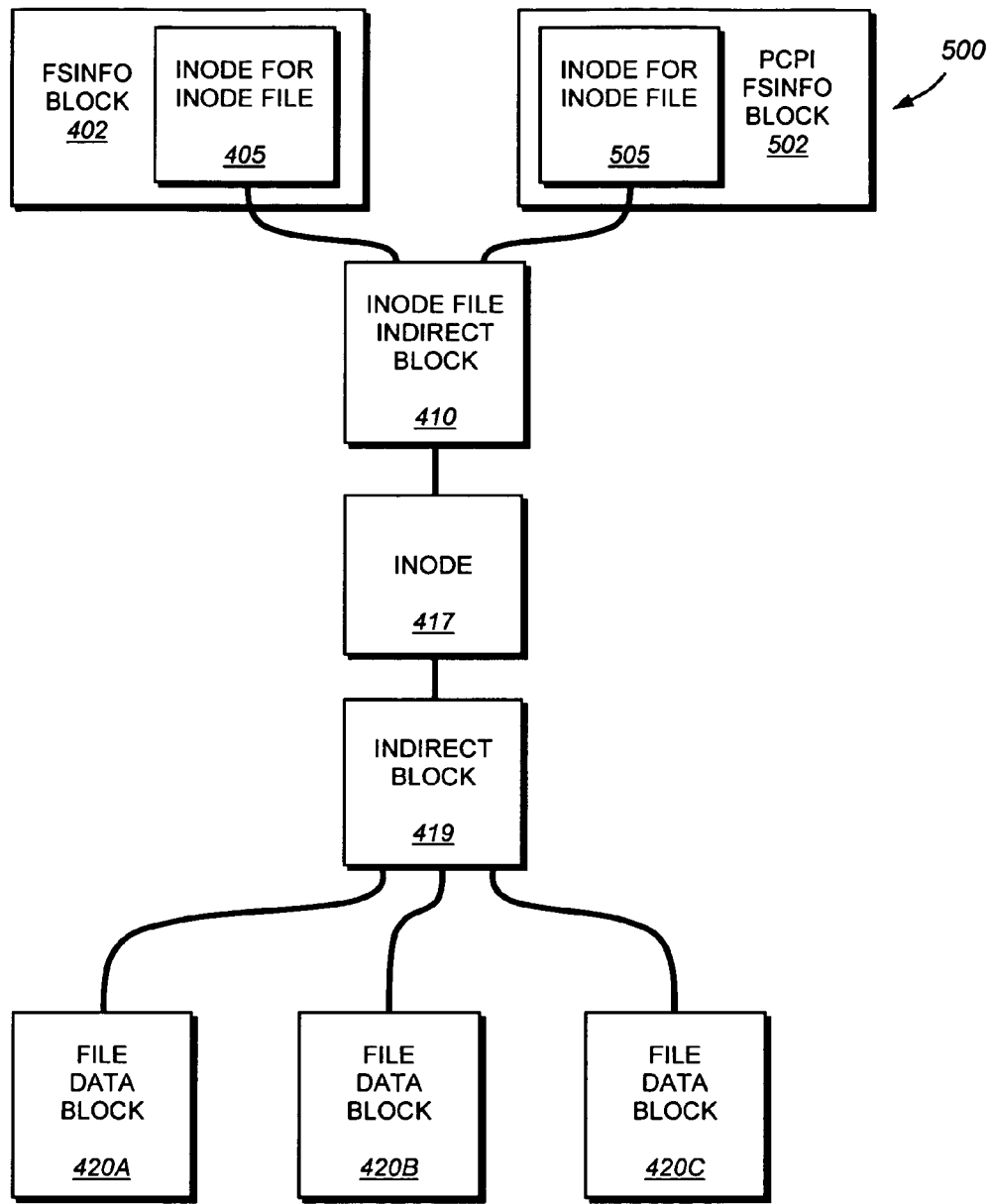
FIG. 5 is a schematic block diagram of an exemplary inode buffer tree showing the generation of a persistent consistency point image (PCPI) inode in accordance with an embodiment of the present invention.
Figure 6:
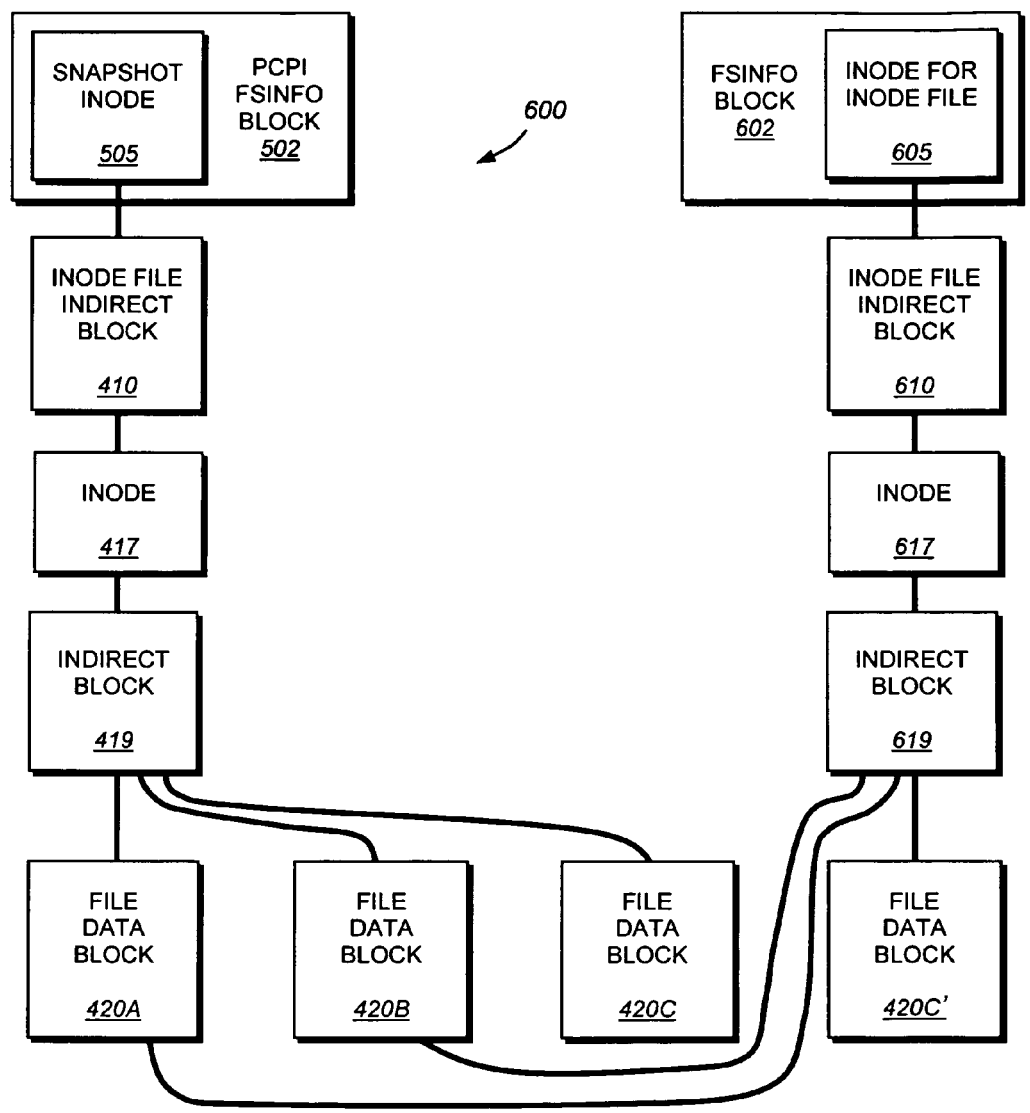
FIG. 6 is a schematic block diagram of an exemplary inode buffer tree showing a newly generated buffer tree in response to write data in accordance with an embodiment of the present invention.

When the file system generates a PCPI of its active file system, a PCPI fsinfo block 502 is generated as shown in FIG. 5. The PCPI fsinfo block 502 includes a PCPI inode for the inode file 505. The PCPI inode for the inode file 505 is, in essence, a duplicate copy of the inode for the inode file 405 of the file system 400 that shares common parts, such as inodes and blocks, with the active file system. For example, the exemplary file system structure 500 includes the inode file indirect blocks 410, inodes 417, indirect blocks 419 and file data blocks 420A-C as in FIG. 4. When a user modifies a file data block, the file system writes the new data block to disk and changes the active file system to point to the newly created block. FIG. 6 shows an exemplary inode file system structure 600 after a file data block has been modified. In this example, file data block 420C is modified to file data block 420C'. As a result, the contents of the modified file data block are written to a new location on disk as a function of the exemplary file system. Because of this new location, the indirect block 619 must be rewritten. Due to this changed indirect block 619, the inode 617 must be rewritten. Similarly, the inode file indirect block 610 and the inode for the inode file 605 must be rewritten.

Thus, after a file data block has been modified the PCPI inode 505 contains a pointer to the original inode file indirect block 410 which, in turn, contains pointers through the inode 417 and indirect block 419 to the original file data blocks 420A, 420B and 420C. The newly written indirect block 619 also includes pointers to unmodified file data blocks 420A and 420B. That is, the unmodified data blocks in the file of the active file system are shared with corresponding data blocks in the PCPI file, with only those blocks that have been modified in the active file system being different than those of the PCPI file.

However, the indirect block 619 further contains a pointer to the modified file data block 420C' representing the new arrangement of the active file system. A new inode for the inode file 605 is established representing the new structure 600. Note that metadata (not shown) stored in any PCPI blocks (e.g., 505, 410, and 420C) protects these blocks from being recycled or overwritten until they are released from all PCPIs. Thus, while the active file system inode for the inode file 605 points to new blocks 610, 617, 619, 420A, 420B and 420C', the old blocks 505, 410 and 420C are retained until the PCPI is fully released.

Figure 7:
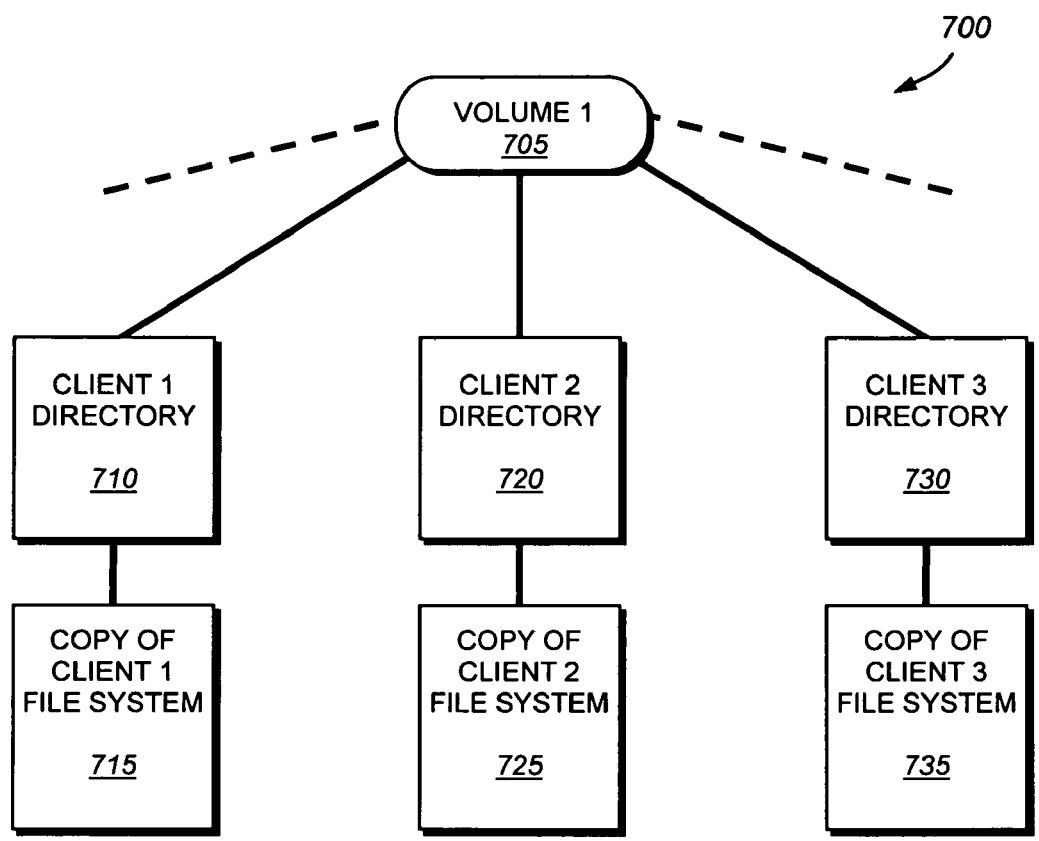
FIG. 7 is a schematic block diagram of an exemplary destination volume illustrating coalescing of multiple backup clients' file systems to a single destination volume in accordance with an embodiment of the present invention.

In accordance with an illustrative embodiment of the present invention, a plurality of data collections, such as volumes, file systems, quota trees (qtrees), etc., from one or more clients of the storage system may be coalesced and stored within a single data collection, e.g., a volume, on the storage system during backup operations. This coalescing enables multiple source data collections to be managed as a single entity on the backup storage system 120. An exemplary file system 700 of backup storage system 120 configured to coalesce a plurality of data collections is shown in FIG. 7. In this illustrative embodiment, the storage volume associated with the storage system containing the stored file systems of the clients is labeled Volume 1 (705). The volume 705 includes directories 710-730 associated with backup clients 1-3.

During backup operations, the backup storage system 120 replicates each client's file system into the appropriate directory, by performing, e.g., the backup/restore operation described in U.S. Pat. No. 7,475,098 entitled SYSTEM AND METHOD FOR MANAGING A PLURALITY OF SNAPSHOTS. Thus, each client directory becomes, in essence, the root, or top-level, directory of a file system associated with the client. Each of the client directories 710, 720 and 730 includes a replica or backup of the client file system. For example, directory 710 stores a backup copy of the file system associated with client 1 (715). Similarly, client 2 directory 720 stores a backup copy of the file system associated with client 2 (725) and client 3 directory 730 stores a backup copy for the file system associated with client 3 (735). By generating a single PCPI of the file system 700, the backup storage system 120 has effectively generated a PCPI of each of the client's file systems without requiring the reservation of a separate volume for each client.

D. Data Dedepulication for Storage System Utilizing PCPIs

The present invention provides a system and method for managing data deduplication on a storage system utilizing one or more persistent consistency point images (PCPIs). Specifically, in a backup storage system utilizing PCPIs as a form of backup, a backup management module is configured to interface with a data deduplication module to implement data deduplication for one or more data collections e.g., volumes or file systems, within the backup storage system. In operation, the backup management module receives a transfer request from a source storage system ("source") and begins accepting transfers of the data collections from the source to a destination volume on the backup storage system. Multiple transfers may be running in parallel to back up multiple sources to the same destination volume. Once the last data transfer to a given destination volume completes, the backup management module, in cooperation with a file system, generates a first PCPI of the destination volume. The backup management module then performs certain cleanup operations of temporary files generated during the course of the data transfers before generating a second PCPI of the destination volume. The backup management module then generates a third, or target, PCPI prior to exporting the target PCPI to one or more clients.

Once the target PCPI has been generated, the transfer request is deemed to have completed and the transferred data is accessible by the clients of the backup storage system. Additionally, once the target PCPI has been generated, the backup management module alerts the data deduplication module to begin deduplication of the data contained within the target PCPI. The data deduplication module performs a deduplication procedure by identifying and removing identical blocks of data until only one of the identical blocks of data is retained. Once the deduplication procedure has completed, the active file system of the backup storage system has been deduplicated, however, the exported target PCPI remains un-deduplicated. In response, the backup management module generates and exports a revised target PCPI. The previous target PCPI may then be deleted, thereby transitioning the exported PCPI's image of the state of the file system to a deduplicated state.

Figure 8:
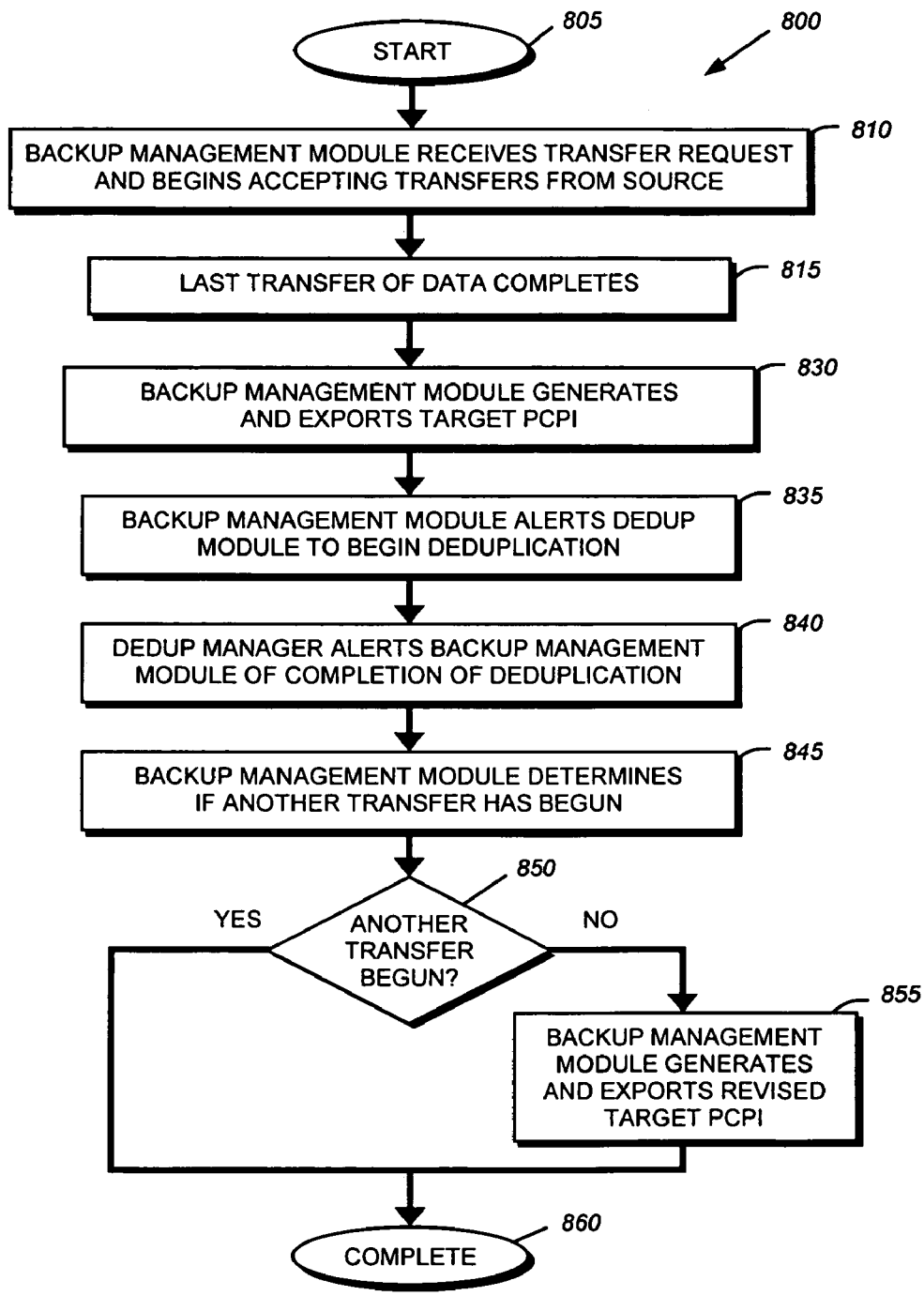
FIG. 8 is a flowchart detailing the steps of a procedure for data deduplication for a storage system utilizing PCPIs in accordance with an embodiment of the present invention.

FIG. 8 is a flowchart detailing the steps of a procedure 800 for managing data deduplication in a storage system utilizing PCPIs in accordance with an illustrative embodiment of the present invention. The procedure 800 begins in step 805 and continues to step 810 where the backup management module 284 receives a transfer request from one or more backup clients and begins accepting transfers from the source. That is, a client (i.e. a source) may transmit a request to the backup management module indicating that it is to begin a new backup operation. In response, the backup management module receives the transmitted data from the source and generates a backup within the storage system's file system. As used herein, the term "source" references one or more clients that transmit data collections, such as file systems, volumes, and/or qtrees, to the same destination volumes on the storage system for backup purposes. The data transfers continue until a last transfer completes in step 815. It should be noted that the data transfers may take a varying amount of time. That is, for example, a single source may transfer a plurality of data collections, whereas each transfer may consume a different amount of time. Once the last data transfer completes, the backup management module 284 generates and exports a target PCPI in step 830. By export it is meant that the backup management module 284 causes the target PCPI to be visible and accessible to a client of the storage system.

Once the target PCPI has been generated and exported, the transfer is deemed to have been completed and the data is made accessible from the storage system. In step 835, the backup management module 284 alerts the deduplication module 286 to begin deduplication of the data transferred into the destination volume. In accordance with an illustrative embodiment of the present invention, the deduplication module utilizes the deduplication technique described in the above-referenced U.S. patent application Ser. No. 11/105,895, filed on Apr. 13, 2005, entitled METHOD AND APPARATUS FOR IDENTIFYING AND ELIMINATING DUPLICATE DATA BLOCKS AND SHARING DATA BLOCKS IN A STORAGE SYSTEM, by Ling Zheng, et al. However, it should be noted that any data deduplication technique may be utilized in accordance with alternate embodiments of the present invention. At the completion of deduplication, each block should be unique, i.e., no two data blocks should have identical data contained therein.

It should also be noted that the deduplication module 286 will detect if another deduplication procedure is ongoing, and, in response, will not initiate a second data deduplication process until such time as the first has completed. Once the deduplication procedure is complete, the deduplication module 286 alerts the backup management module 284 of the completion in step 840. The backup management module 284 determines if another transfer has begun in step 845. That is, the backup management module 284 determines if a second transfer from a source has begun during the course of the deduplication. If no transfer has begun in step 850, the procedure 800 branches to step 855 and the backup management module 284 generates and exports a revised target PCPI. Additionally, the backup management module 284 deletes the target PCPI before the procedure 800 completes in step 860. If, however in step 850 a transfer has begun, then the procedure 800 branches to step 860 and completes.

Figure 9:
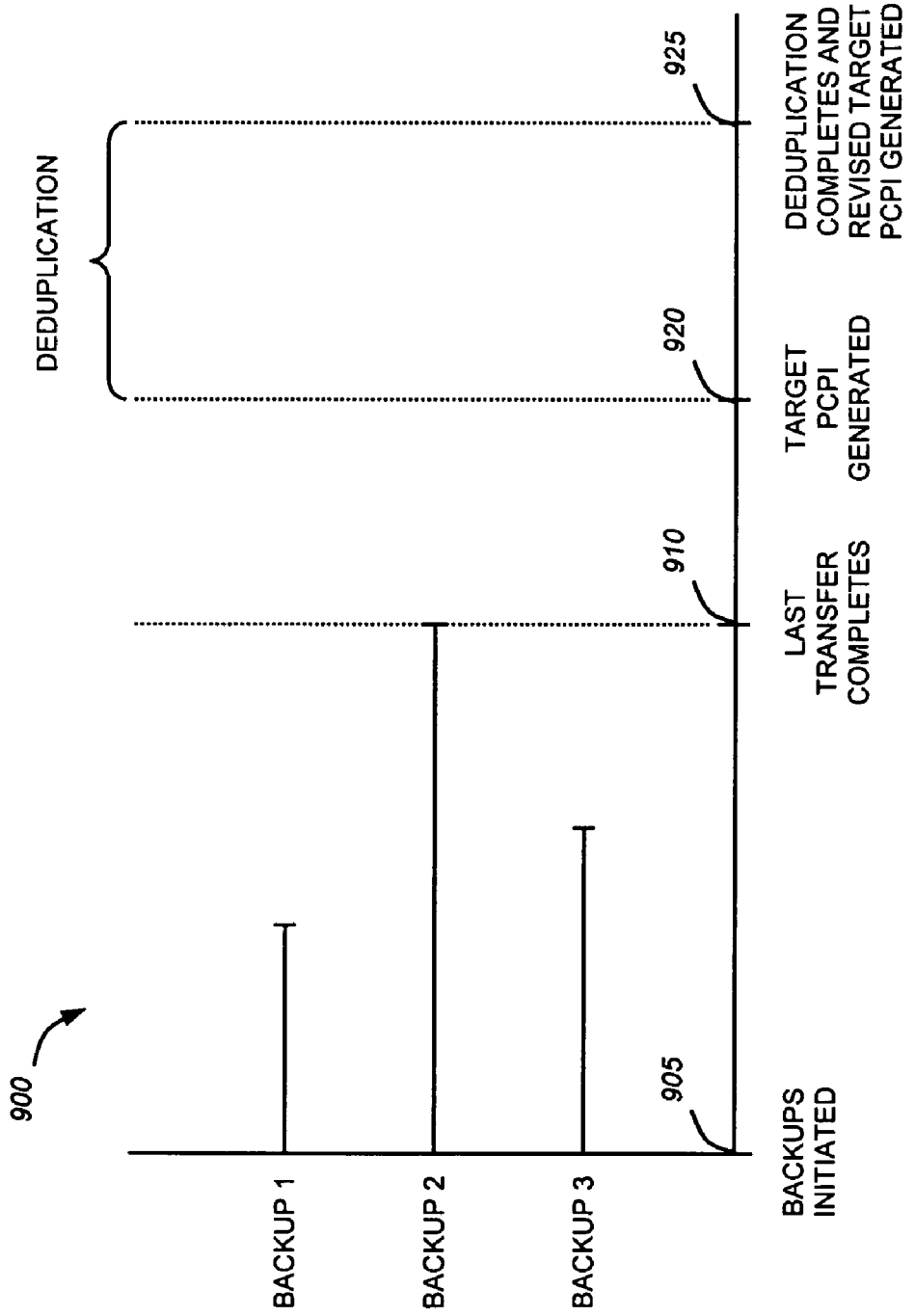
FIG. 9 is a diagram illustrating data deduplication of a storage system utilizing PCPIs in accordance with an embodiment of the present invention.

FIG. 9 is a diagram illustrating management of PCPIs in a storage system utilizing PCPIs in accordance with an embodiment of the present invention. Initially, at time 905 the backup operations, e.g., backup 1, backup 2 and backup 3, for the storage system are initiated. Backup operations may take a varying length of time; for example, backup 2 takes significantly more time to complete then backups 1 and 3. As described above in reference to procedure 800, at time 910 the last transfer of a backup operation completes and a target PCPI is generated at time 920. Thus, at time 920, the target PCPI is exported and available to clients for access. Once the target PCPI has been generated, a deduplication process is begun and, once it completes, a revised target PCPI is generated at step 925. When the revised target PCPI is generated, the original target PCPI is deleted (freed), thereby transitioning to a deduplicated state.

Figure 10:
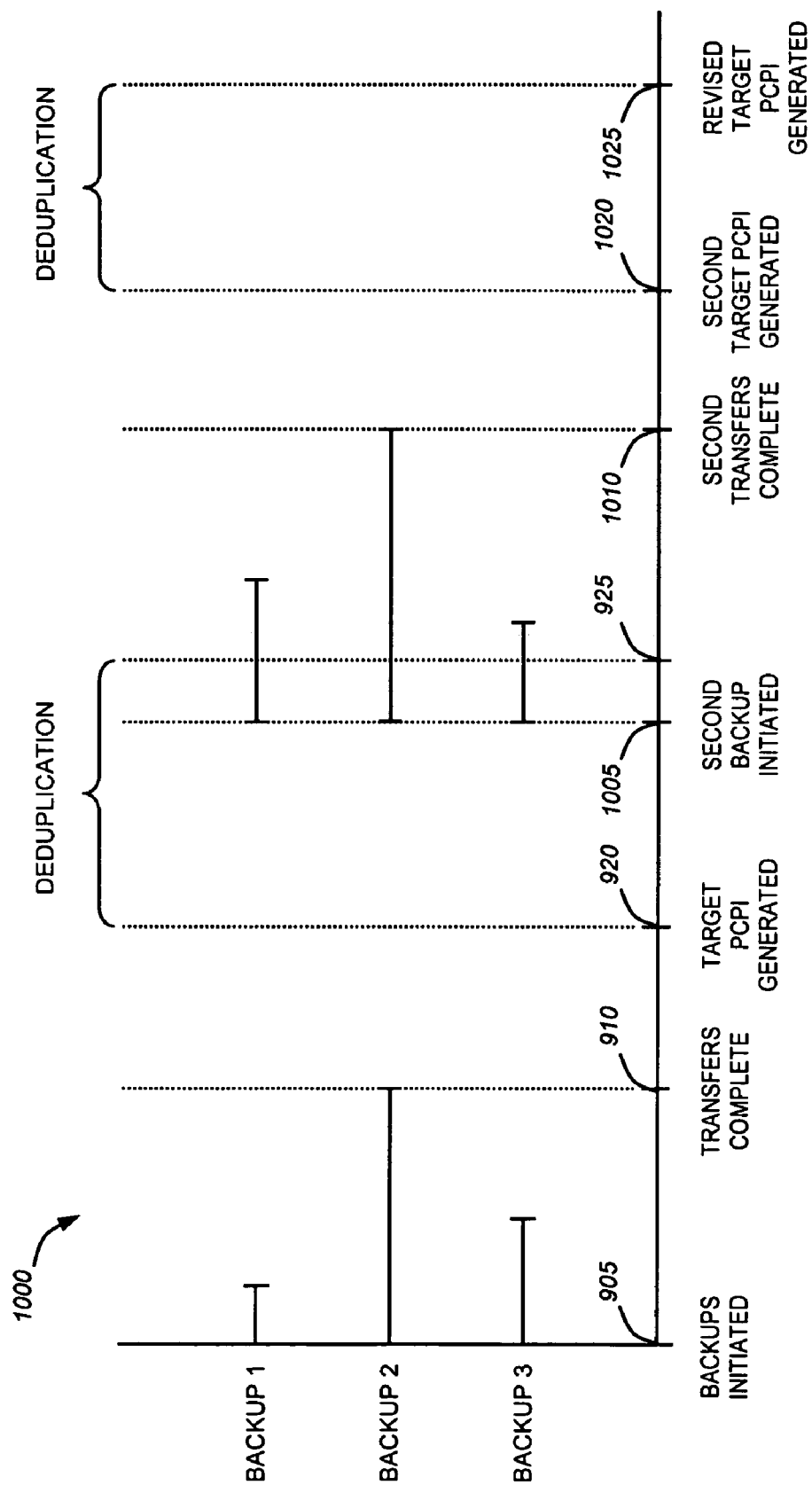
FIG. 10 is a diagram illustrating data deduplication in a storage system utilizing PCPIs when a second transfer begins before the completion of a first deduplication procedure in accordance with an embodiment of the present invention.

FIG. 10 is a diagram illustrating management of PCPIs in a storage system utilizing PCPIs in accordance with an embodiment of the present invention. Similar to the environment 900, a first set of backup operations is initiated at time 905 with the corresponding data transfers completing at time 910. The target PCPI is then generated and a data deduplication procedure begins at time 920. The data deduplication procedure completes at time 925. However, at time 1005, which is prior to the completion of the deduplication procedure, a second set of backup operations is initiated. The data transfers corresponding to this second set complete at time 1010. At time 1020 a second target PCPI is generated and a second data deduplication occurs. The second data deduplication completes and a revised target PCPI is generated at time 1025. At this time, the second target PCPI is deleted, but the original target PCPI generated at time 920 is retained.

Figure 11:
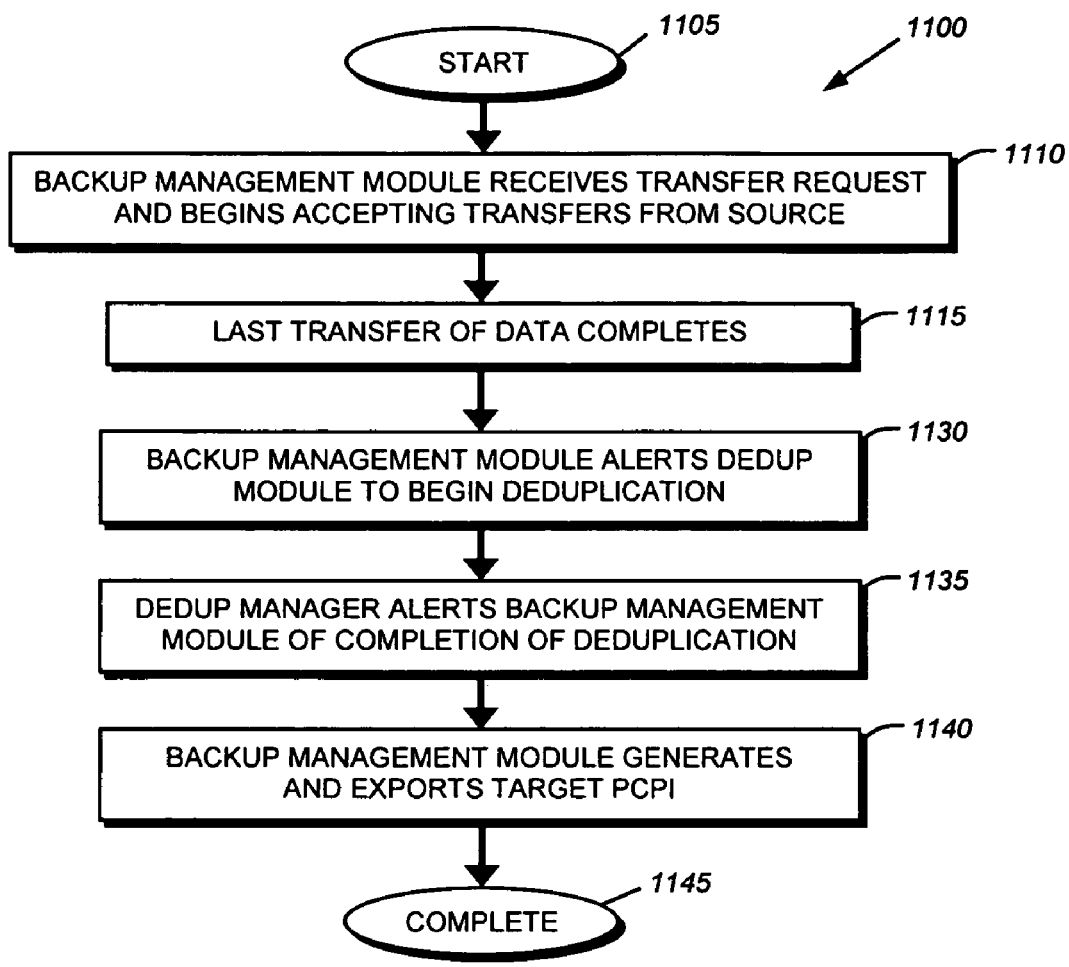
FIG. 11 is a flowchart detailing the steps of a procedure for performing data deduplication a storage system utilizing PCPIs in accordance with an embodiment of present invention.

FIG. 11 is a flowchart detailing the steps of a procedure 1100 for performing data deduplication in a storage system utilizing PCPIs in accordance with an alternate embodiment of the present invention. Such an alternate embodiment may be utilized in storage systems where it is impermissible to delete the target PCPI if it is created with a long retention period. The procedure 1100 begins in step 1105 and continues to step 1110 where the backup management module 284 receives a transfer request from one or more backup clients and begins accepting transfers from the source. That is, a client (i.e. a source) may transmit a request to the backup management module indicating that it is to begin a new backup operation. In response, the backup management module receives the transmitted data from the source and generates a backup within the storage system's file system. The data transfers continue until a last transfer completes in step 1115.

Once the last data transfer completes, the backup management module 284 then alerts the deduplication module 286 to begin deduplication of the target PCPI of the destination volume in step 1130. Once the deduplication procedure is complete, the deduplication module 286 alerts the backup management module 284 of the completion in step 1135. The backup management module 284 then generates and exports a target PCPI in step 1140. Once the target PCPI has been generated and exported, the transfer is deemed to have been completed and the data is made accessible from the storage system. The procedure 1100 then completes in step 1145. As noted, this alternate embodiment may be utilized when the PCPIs are to have (substantially) long retention time periods. By not generating the target PCPI until after the deduplication procedure has completed, the procedure 1100 ensures that only deduplicated data is stored in the target PCPI.

Figure 12:
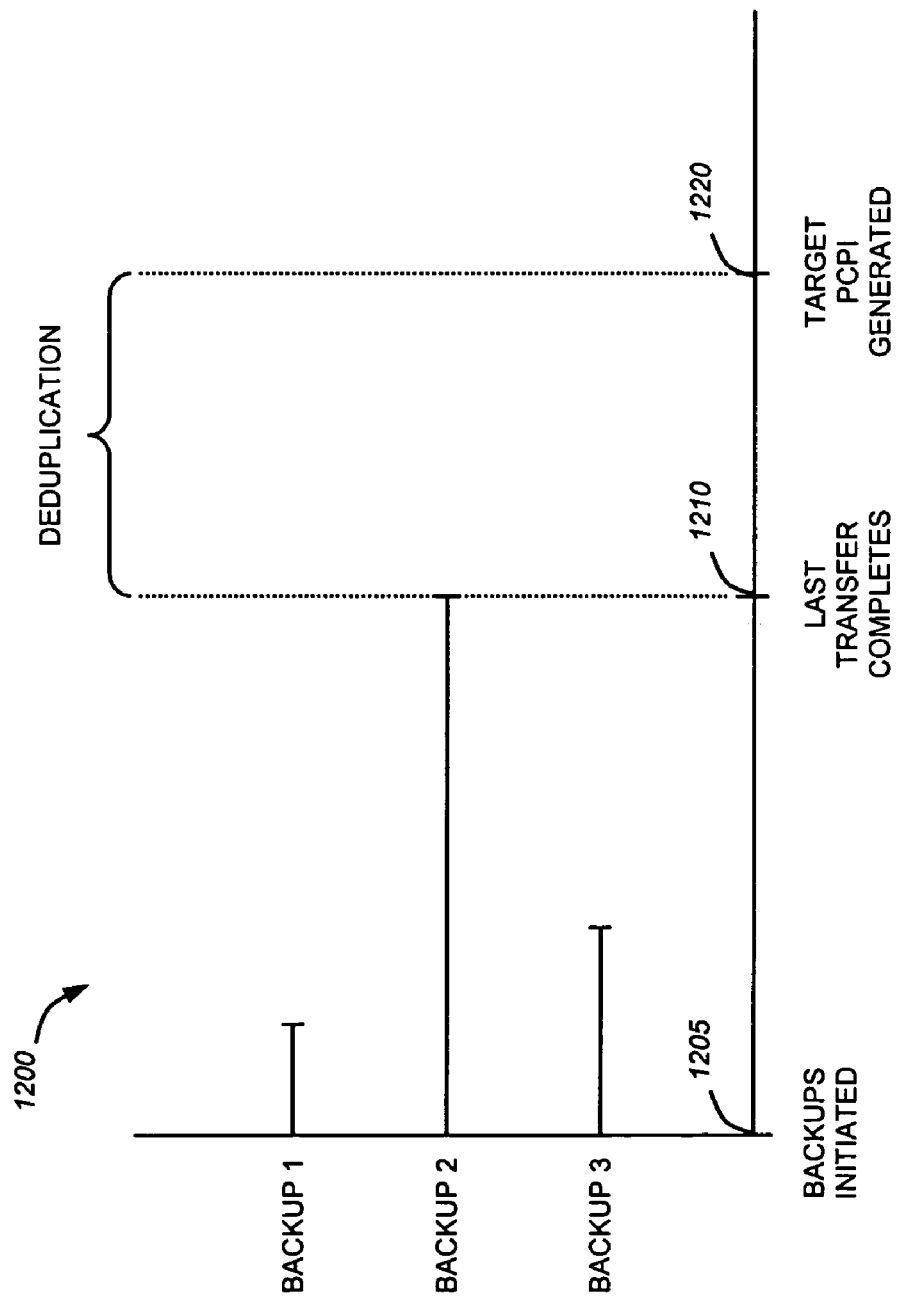
FIG. 12 is a diagram illustrating data deduplication in a storage system utilizing PCPIs in accordance with embodiment of the present invention.

FIG. 12 is a diagram illustrating management of PCPIs in accordance with an alternate embodiment as described above in reference to procedure 1100. At time 1205 the backup operations are initiated with the last corresponding data transfer completing at time 1210 At this time, a data deduplication procedure is performed, which differentiates this embodiment from that described above in reference to procedure 800. Once the deduplication procedure completes, the target PCPI is generated at time 1220. Thus, in environment 1200, clients may not access the data until it has been deduplicated. Such a need may arise when, e.g., PCPIs are generated with long retention periods.

Figure 13:
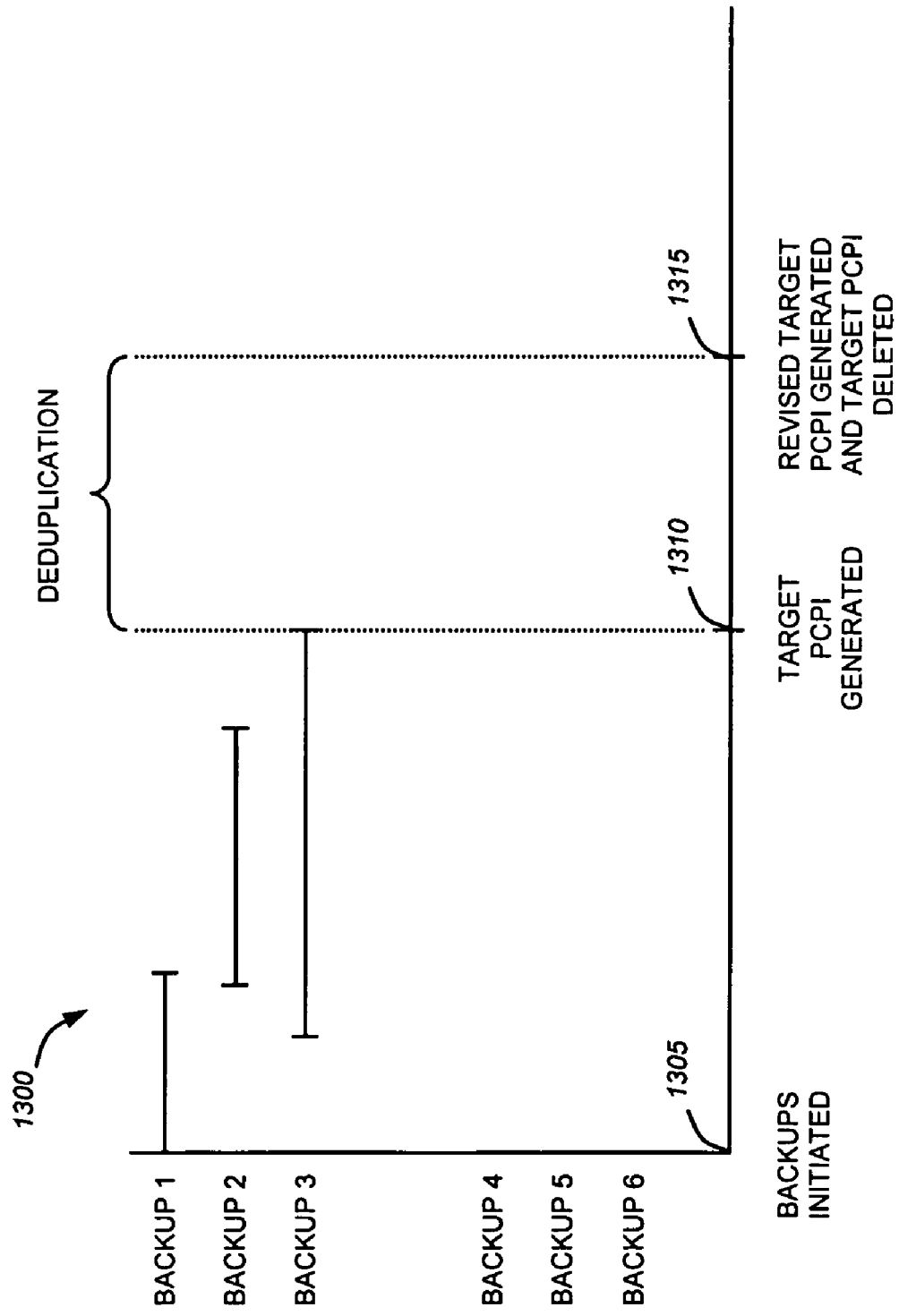
FIG. 13 is a diagram illustrating data deduplication in a system utilizing PCPIs in accordance with an embodiment of the present invention.

FIG. 13 is a diagram illustrating management of PCPIs in accordance with an alternate embodiment of the present invention. In certain embodiments, the data transfers comprising the backup operations may not initiate at the same time. Thus, in environment 1300, the backup operations may be initiated at time 1305, however not all of the backups may actually start transferring data at such time. At time 1310, the target PCPI is generated and a deduplication procedure begins. Once the deduplication procedure completes, a revised target PCPI is generated and the target PCPI is deleted at time 1315.

Figure 14:
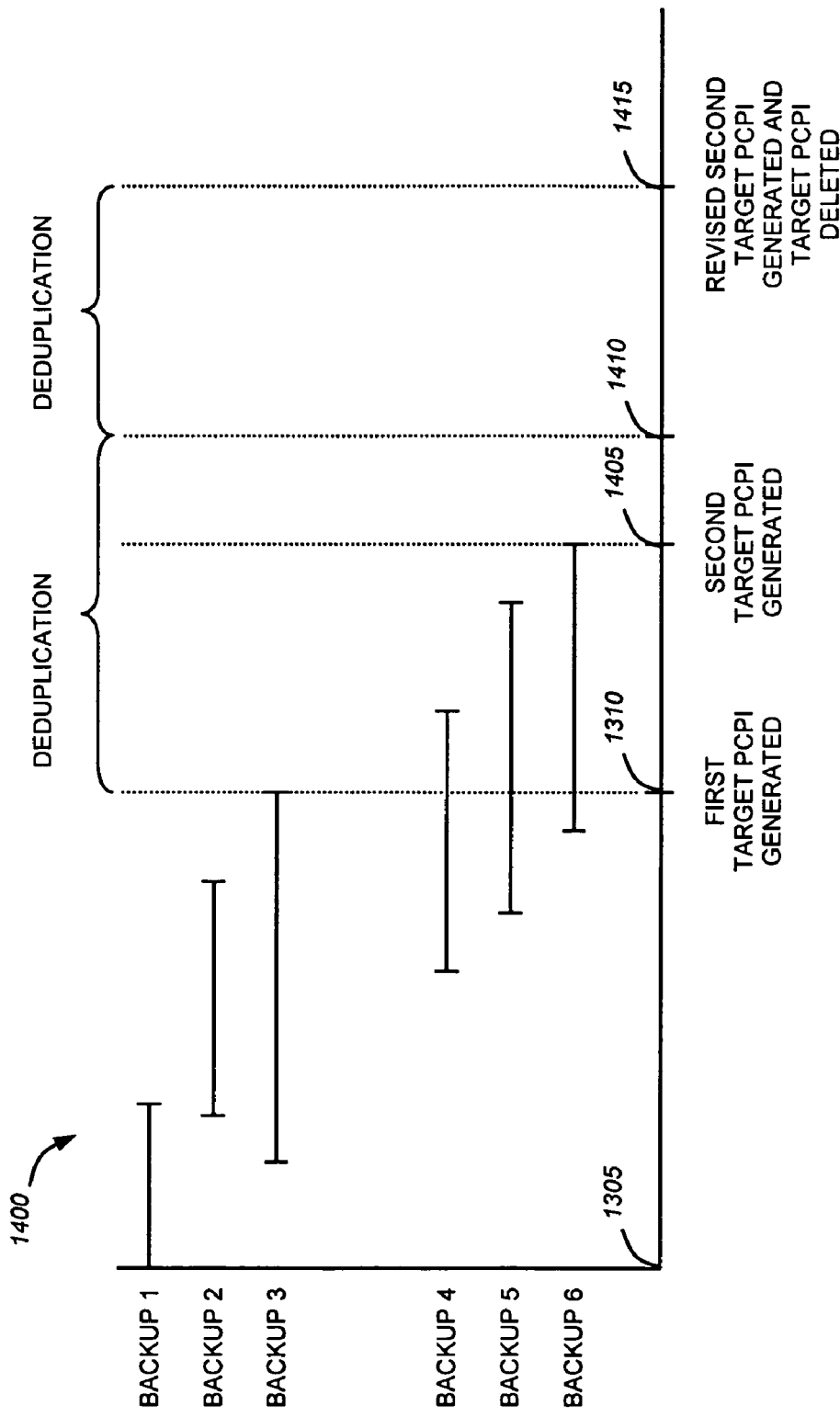
FIG. 14 is a diagram illustrating data deduplication in a storage system utilizing PCPIs in accordance with an embodiment of the present invention.

FIG. 14 is a diagram illustrating management of PCPIs with overlapping data transfers in accordance with an alternate embodiment of the present invention. Similar to environment 1300, a first set of three data transfers associated with backup operations initiate first at time 1305 and complete, with the generation of a first target PCPI at time 1310. A deduplication procedure is also initiated at time 1310. However, prior to the completion of the first set of transfers, backups 4, 5 and 6 are initiated. These latter three transfers complete at time 1405 and a second target PCPI is generated. However, the first deduplication procedure is still proceeding when the second target PCPI is generated. As such, when the first deduplication procedure completes at time 1410, no revised target PCPI is generated unless any of the new backups are an incremental backup, e.g., backup 4 is an incremental backup of backup 1. Instead, a second deduplication procedure is commenced and when the second deduplication procedure completes, at time 1415, a revised second target PCPI is generated and the second target PCPI (previously generated at time 1405) is deleted.

To again summarize, the present invention provides a system and method for managing data deduplication on a storage system utilizing one or more persistent consistency point images (PCPIs). Specifically, in a backup storage system utilizing PCPIs as a form of backup, a backup management module is configured to interface with a data deduplication module to implement data deduplication for one or more data collections e.g., volumes or file systems, within the backup storage system. In operation, the backup management module receives a transfer request from a source storage system and begins accepting transfers the data collections from the source to a destination volume on the backup storage system. Once the last data transfer completes, the backup management module then generates a target, PCPI prior to exporting the target PCPI to one or more clients.

Once the target PCPI has been generated, the transfer request is deemed to have completed and the transferred data is accessible by the clients of the backup storage system. Additionally, once the target PCPI has been generated, the backup management module alerts the data deduplication module to begin deduplication of the data contained within the target PCPI. The data deduplication module performs a deduplication procedure by identifying and removing identical blocks of data until only one of the identical blocks of data is retained. Illustratively, this deduplication procedure occurs transparently to the clients to which the target PCPI is exported. Once the deduplication procedure is complete, the backup management module generates and exports a revised target PCPI. The previous target PCPI may then be deleted, thereby transitioning the exported PCPI's image of the state of the file system to a deduplicated state. Thus, the present invention enables the transparent deduplication of an asynchronous mirror while the destination volume is exported as a read-only replica, i.e., the target PCPI is available to clients while the deduplication procedure is ongoing.

It should be noted that while the present invention has been written in terms of a backup storage system environment where the source comprises a storage system. However, the principles of the present invention may be utilized in environments with differing source systems. For example, the source may comprise of a computer executing an application such as a database management system, e-mail server, etc. The source may generate a PCPI of its data, which is subsequently transferred to the destination, where a target PCPI is generated and exported. A deduplication process is then invoked and when completed, a revised target PCPI is generated and exported. Such replication may be utilized for disaster recovery, failover operations, etc.

Furthermore, while this description has been written in terms of storage deduplication, the principles of the present invention may be utilized to provide deduplication over communication links. In such an alternate embodiment, the sending system may perform the above described de-duplication technique to minimize the amount of bandwidth utilized in transmitting data. Such communication based deduplication may occur when, for example, a backup hierarchy is formed, with data being backed up to a first storage system, which is, in turn, backed up to a second storage system. In such a case, the deduplication on the first storage system results in a reduced amount of bandwidth consumed in the later backup operation to the second storage system.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software (including a computer-readable medium having program instructions executing on a computer), hardware, firmware, or a combination thereof. Additionally, while this description has been written in terms of a file system, the present invention may be utilized with non-file system storage, such as a luns and/or other block based storage. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for managing data deduplication on a target storage system, comprising:

receiving a transfer of data from a source storage system to the target storage system;

generating a first persistent consistency point image of the transfer of data, the first persistent consistency point image comprising a first pointer referencing a first block of data and a second pointer referencing a second block of data in an active file system of the target storage system, wherein the first and the second blocks of data comprise identical data;

performing data deduplication on the active file system while the first persistent consistency point image comprises the first and the second pointers referencing the first and the second blocks of data in the active file system;

generating, in response to performing the data deduplication on the active file system, a second persistent consistency point image of the transfer of data, wherein the second persistent consistency point image comprises the second pointer referencing the first data block;

storing the second persistent consistency point image at the target storage system; and deleting the first persistent consistency point image that comprises the second pointer referencing the second data block.

2. The method of claim 1 wherein receiving the transfer of data from the source storage system comprises receiving one or more data streams associated with a data collection to be backed up to the target storage system.

3. The method of claim 2 wherein the data collection comprises a volume.

4. The method of claim 2 wherein the data collection comprises a file system.

5. The method of claim 1 further comprising:

exporting the first persistent consistency point image to one or more clients.

6. The method of claim 1 wherein the second persistent consistency point image is exported to one or more clients so that data deduplication occurs transparently to the one or more clients.

7. The method of claim 1 wherein after the data deduplication of the transfer of data, each remaining block of the transferred data is unique.

8. A system configured to manage data deduplication, comprising:

a target storage system configured to execute a storage operating system, the storage operating system comprising a backup management module configured to receive a transfer of data from a source storage system, the target storage system further configured to generate a first persistent consistency point image of the transfer of data, the first persistent consistency point image comprising a pointer referencing duplicate data in an active file system of the target storage system;

a deduplication module configured to execute on the target storage system and further configured to perform data deduplication on the active file system while the first persistent consistency point image comprises the pointer referencing the duplicate data in the active file system;

the backup management module further configured to generate, in response to the deduplication module performing the data deduplication on the active file system, a second persistent consistency point image of the transfer of data;

the target storage system further configured to store the second persistent consistency point image; and the backup management module further configured to delete the first persistent consistency point image that comprises the pointer referencing the duplicate data.

9. The system of claim 8 wherein the transferred data comprises a volume.

10. The system of claim 8 wherein the transferred data comprises a file system.

11. The system of claim 8 wherein the target storage system is further configured to export the second persistent consistency point image to the one or more clients.

12. The system of claim 8 wherein the backup management module is further configured to initiate a backup data transfer during the data deduplication.

13. The system of claim 12 wherein the deduplication module is further configured to yield to the backup management module.

14. The system of claim 8 wherein the backup management module is further configured to export the first persistent consistency point image to one or more clients.

15. A computer readable medium containing executable program instructions executed by a processor, comprising:

program instructions that receive a transfer of data from a source storage system to a target storage system;

program instructions that generate a first persistent consistency point image of the transfer of data, the first persistent consistency point image comprising a first pointer referencing a first block of data and a second pointer referencing a second block of data in an active file system of the target storage system, wherein the first and the second blocks of data comprise identical data;

program instructions that perform data deduplication on the active file system while the first persistent consistency point image comprises the first and the second pointers referencing the first and the second data blocks in the active file system;

program instructions that generate, in response to performing the data deduplication on the active file system, a second persistent consistency point image of the transfer of data, wherein the second persistent consistency point image comprises the second pointer referencing the first data block;

program instructions that store the second persistent consistency point image at the target storage system; and program instructions that delete the first persistent consistency point image that comprises the pointer referencing the second data block.

16. The computer readable medium of claim 15 further comprising program instructions that receive one or more data streams associated with a data collection to be backed up to the target storage system.

17. The computer readable medium of claim 16 wherein the data collection comprises a volume.

18. The computer readable medium of claim 16 wherein the data collection comprises a file system.

19. The computer-readable medium of claim 15 further comprising program instructions that export the second persistent consistency point image to one or more clients.

20. A system configured to manage data deduplication, comprising:

a target storage system configured to execute a storage operating system, the storage operating system comprising a backup management module configured to receive a transfer of data from a source storage system and further configured to generate a first persistent consistency point image of the transfer of data, the first persistent consistency point image comprising a first pointer referencing a first block of data and a second pointer referencing a second block of data in an active file system of the target storage system, wherein the first and the second blocks of data comprise identical data;

a deduplication module configured to execute on the target storage system and further configured to perform data deduplication on the active file system while the first persistent consistency point image comprises the first and the second pointers referencing the first and the second blocks of data in the active file system;

the deduplication module further configured to determine whether another transfer of data has begun;

the backup management module further configured to generate, in response to determining that another transfer of data has not begun, a second persistent consistency point image of the transfer of data, wherein the second persistent consistency point image comprises the second pointer referencing the first data block; and the backup management module further configured to delete the first persistent consistency point image that comprises the second pointer referencing the second data block.

21. The system of claim 20 wherein the transfer of data comprises a volume.

22. The system of claim 20 wherein the transfer of data comprises a file system.

23. A computer data storage system, comprising:

one or more source storage systems configured to transmit a first set of one or more data streams;

a backup storage system accessible to one or more clients, the backup storage system configured to receive the first set of one or more data streams; and a processor configured to execute a storage operating system on the backup storage system, the storage operating system configured to:

generate a first persistent consistency point image of the backup storage system, the first persistent consistency point image comprising a first pointer referencing a first block of data and a second pointer referencing a second block of data in an active file system of the backup storage system, wherein the first and the second blocks of data comprise identical data;

deduplicate data of the first set of one or more data streams on the active file system while the first persistent consistency point image comprises the first and the second pointers referencing the first and the second blocks of data in the active file system;

receive a second set of one or more data streams prior to the completion of deduplication;

generate a second persistent consistency point image in response to completing the deduplication, wherein the second persistent consistency point image comprises the second pointer referencing the first data block; and retain, in response to receiving the second set of one or more data streams prior to the completion of deduplication, the first persistent consistency point image.

* * * * *

UNITED STATES PATENT AND TRADEMARK OFFICE
CERTIFICATE OF CORRECTION

| | | |
|---|---|---|
| PATENT NO. | : 7,921,077 B2 | Page 1 of 1 |
| APPLICATION NO. | : 11/478272 | |
| DATED | : April 5, 2011 | |
| INVENTOR(S) | : Daniel Ting | |

It is certified that error appears in the above-identified patent and that said Letters Patent is hereby corrected as shown below:

Col. 8, Line 62, please replace "sementics" with --semantics--

Signed and Sealed this
Thirty-first Day of May, 2011

David J. Kappos
*Director of the United States Patent and Trademark Office*